(12) United States Patent
Gill et al.

(10) Patent No.: US 6,504,689 B1
(45) Date of Patent: Jan. 7, 2003

(54) TUNNEL JUNCTION READ HEAD WITH FLUX GUIDE COUPLED TO AND MAGNETICALLY EXTENDING A RECESSED FREE LAYER TO AN AIR BEARING SURFACE

(75) Inventors: Hardayal Singh Gill, Portala Valley, CA (US); Douglas Johnson Werner, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 178 days.

(21) Appl. No.: 09/614,932

(22) Filed: Jul. 12, 2000

(51) Int. Cl.⁷ .................................................. G11B 5/39
(52) U.S. Cl. ................................ 360/324.2; 360/324.12
(58) Field of Search ........................... 360/321, 324.2, 360/126; 365/171, 173; 338/32 R; 324/252

(56) References Cited

U.S. PATENT DOCUMENTS

| | | | |
|---|---|---|---|
| 5,636,093 A | * 6/1997 | Gijs et al. ................... 360/126 |
| 5,650,958 A | 7/1997 | Gallagher et al. ........... 365/173 |
| 5,715,121 A | * 2/1998 | Sakakima et al. ........ 360/324.2 |
| 5,729,410 A | 3/1998 | Fontana, Jr. et al. ......... 360/113 |
| 5,862,022 A | * 1/1999 | Noguchi et al. .......... 360/324.2 |
| 5,898,547 A | * 4/1999 | Fontana, Jr. et al. ..... 360/324.2 |
| 5,930,087 A | * 7/1999 | Brug et al. ............... 360/324.2 |
| 6,219,213 B1 | * 4/2001 | Goto et al. ............... 360/329.2 |
| 6,327,107 B1 | * 12/2001 | Komuro et al. ................ 360/55 |
| 6,344,954 B1 | * 2/2002 | Redon et al. ............. 360/324.2 |

* cited by examiner

Primary Examiner—Jefferson Evans
(74) Attorney, Agent, or Firm—Ervin F. Johnston

(57) ABSTRACT

A tunnel junction read head is provided with free and pinned layers which are recessed from the ABS with the free layer being connected to a flux guide which extends the free layer to the ABS for conducting signal fields to the free layer from a rotating magnetic disk. With this arrangement the typical narrow spacing between the free and pinned layers at the ABS is obviated so that upon lapping of the read head during its construction, conductive material will not be smeared between these layers so as to cause shorting therebetween.

46 Claims, 6 Drawing Sheets

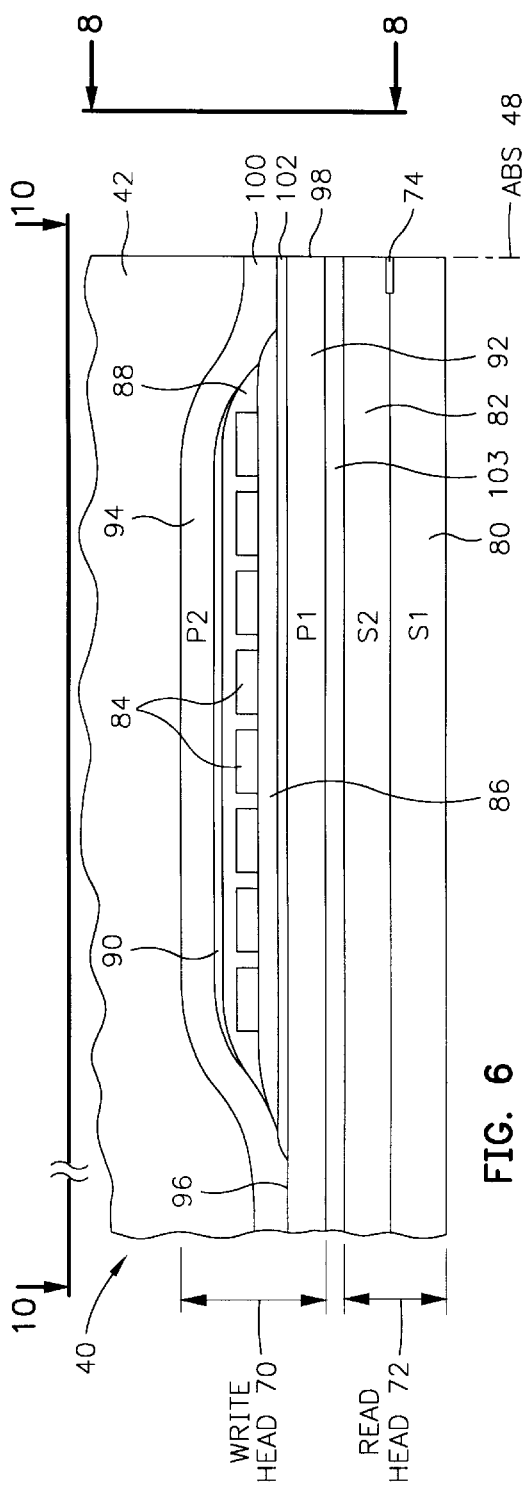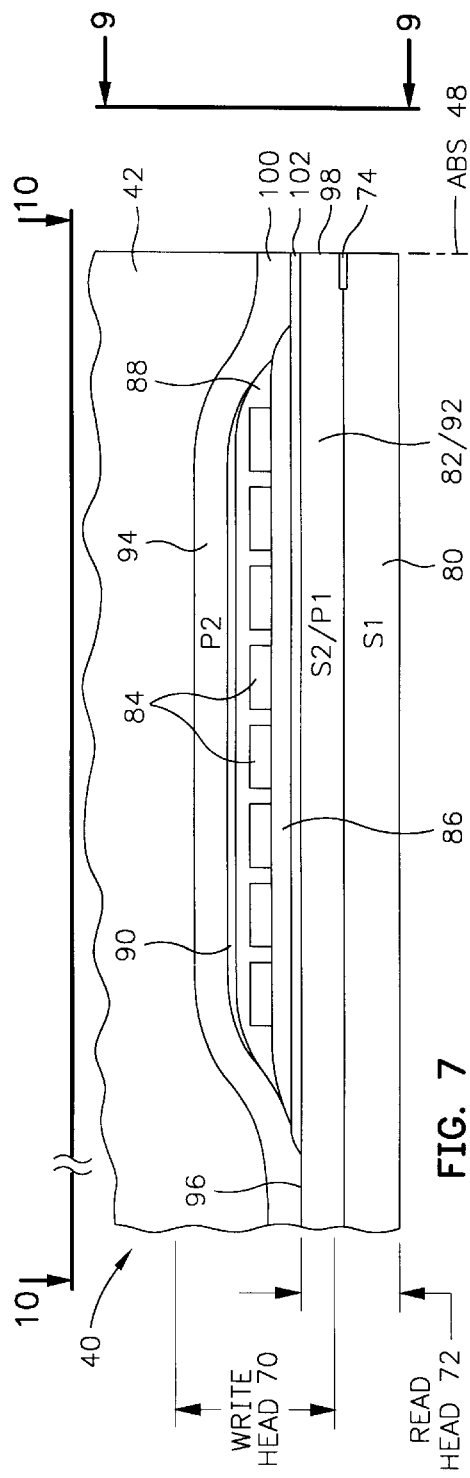

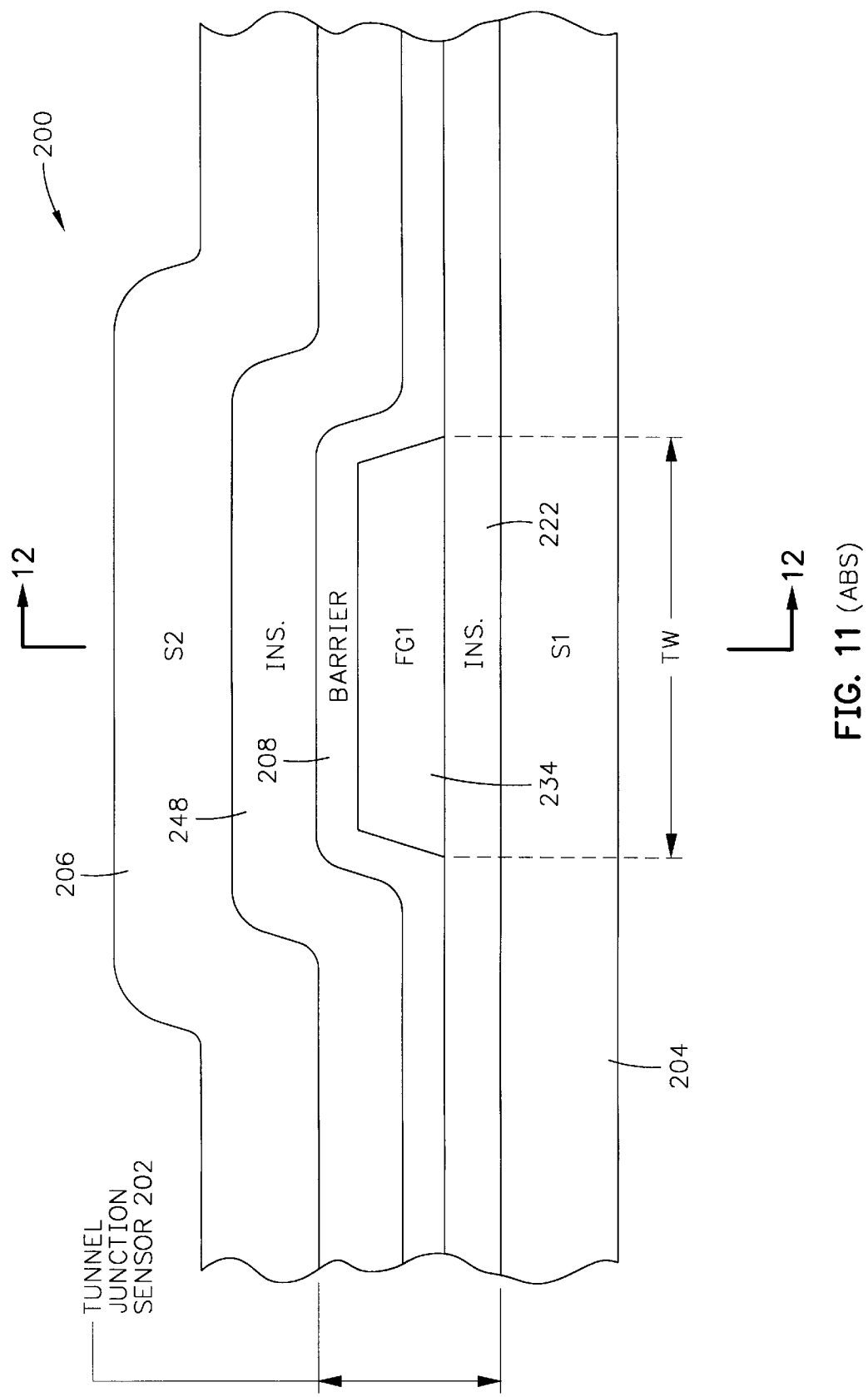
FIG. 11 (ABS)

TUNNEL JUNCTION READ HEAD WITH FLUX GUIDE COUPLED TO AND MAGNETICALLY EXTENDING A RECESSED FREE LAYER TO AN AIR BEARING SURFACE

BACKGROUND OF THE INVENTION

1. Field of the Invention

The present invention relates to a tunnel junction read head with a flux guide coupled to and magnetically extending a recessed free layer to an air bearing surface and, more particularly, to such a flux guide which permits both a free layer and a pinned layer to be recessed from the ABS so as to prevent shorting therebetween by conductive material which is smeared across the ABS by lapping during construction of the read head.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a tunnel junction sensor for sensing the magnetic signal fields from the rotating magnetic disk. The sensor includes an insulative tunneling or barrier layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. The tunnel junction sensor is located between ferromagnetic first and second shield layers. First and second leads, which may be the first and second shield layers, are connected to the tunnel junction sensor for conducting a tunneling current therethrough. The tunneling current is conducted perpendicular to the major film planes (CPP) of the sensor as contrasted to a spin valve sensor where the sense current is conducted parallel to the major film planes (CIP) of the spin valve sensor. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the tunneling current is conducted through the sensor without magnetic field signals from the rotating magnetic disk.

When the magnetic moments of the pinned and free layers are parallel with respect to one another the resistance of the tunnel junction sensor to the tunneling current ($I_T$) is at a minimum and when their magnetic moments are antiparallel the resistance of the tunnel junction sensor to the tunneling current ($I_T$) is at a maximum. Changes in resistance of the tunnel junction sensor is a function of cos θ, where θ is the angle between the magnetic moments of the pinned and free layers. When the tunneling current ($I_T$) is conducted through the tunnel junction sensor resistance changes, due to signal fields from the rotating magnetic disk, cause potential changes that are detected and processed as playback signals. The sensitivity of the tunnel junction sensor is quantified as magnetoresistive coefficient dr/R where dr is the change in resistance of the tunnel junction sensor from minimum resistance (magnetic moments of free and pinned layers parallel) to maximum resistance (magnetic moments of the free and pinned layers antiparallel) and R is the resistance of the tunnel junction sensor at minimum resistance. The dr/R of a tunnel junction sensor can be on the order of 40% as compared to 10% for a spin valve sensor.

Magnetic head assemblies, wherein each magnetic head assembly includes a read head and a write head combination, are constructed in rows and columns on a wafer. After completion at the wafer level, the wafer is diced into rows of magnetic head assemblies and each row is lapped by a grinding process to lap the row to a predetermined air bearing surface (ABS). In a typical tunnel junction read head all of the layers are exposed at the ABS, namely first edges of each of the first shield layer, the seed layer, the free layer, the barrier layer, the pinned layer, the pinning layer and the second shield layer. The second edges of these layers are recessed in the head. The barrier layer is a very thin layer, on the order of 20 Å, which places the free and pinned layers very close to one another at the ABS. When a row of magnetic head assemblies is lapped there is a high risk of magnetic material from the free and pinned layers being smeared across the ABS to cause a short therebetween. Accordingly, there is a strong-felt need to construct magnetic head assemblies with tunnel junction heads without the risk of shorting between the free and pinned layers at the ABS due to lapping.

SUMMARY OF THE INVENTION

The present invention overcomes the problem of shorting between the free and pinned layers due to smeared conductive material between these layers at the ABS by recessing both of the free and pinned layers into the head from the ABS with first edges close to the ABS and second edges further recessed into the head. In order to conduct the signal fields from the ABS to the free layer a flux guide is magnetically coupled to the free layer and extends to the ABS. Accordingly, a first edge of the flux guide is exposed at the ABS and preferably a second edge of the flux guide abuts the first edge of the free layer. In order to achieve the abutting junction between the flux guide and the free layer, first and second spaced apart insulation layers may be provided with the first insulation layer extending to the ABS and the second insulation layer extending into the head. The free layer is located in the space between the first and second insulation layers and overlaps a portion of the first insulation layer. The overlapping portion of the free layer then provides the free layer with its first edge for connection to the second edge of the flux guide.

In a still further preferred embodiment the free layer also overlaps a portion of the second insulation layer and a first edge of a second flux guide abuts the second edge of the free layer. The barrier layer may then extend over the first and second flux guides and over the free layer with the pinned layer on top of the barrier layer and the pinning layer on top of the pinned layer. Each of the pinned and pinning layers have first and second edges which are recessed from the ABS and third and fourth insulation layers may be provided with the third insulation layer abutting the first edges of the pinned and pinning layers and extending to the ABS and with the second insulation layer abutting the second edges of the pinned and pinning layers and extending away from the ABS. The second shield layer may then overlay the third insulation layer, the pinning layer and the fourth insulation layer. By electrical contact between the first shield layer and the free layer and electrical contact between the second shield layer and the pinning layer, the first and second shield layers may serve as first and second leads for conducting a sense current perpendicular to the film surfaces of the layers of the tunnel junction sensor. The second flux guide will serve as an extension of the free layer into the head for minimizing flux decay between the free layer and the first and second shield layers.

An object of the present invention is to provide a tunnel junction read head which can be constructed, in part, by lapping to an ABS without the risk of smearing conductive material between the free and pinned layers to cause shorting therebetween.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the. slider and a merged magnetic head as seen in plane 7—7 of FIG. 2;

FIG. 11 is an ABS illustration of the tunnel junction read head; and

DESCRIPTION OF THE PREFERRED EMBODIMENTS

Magnetic Disk Drive

Figure 1:
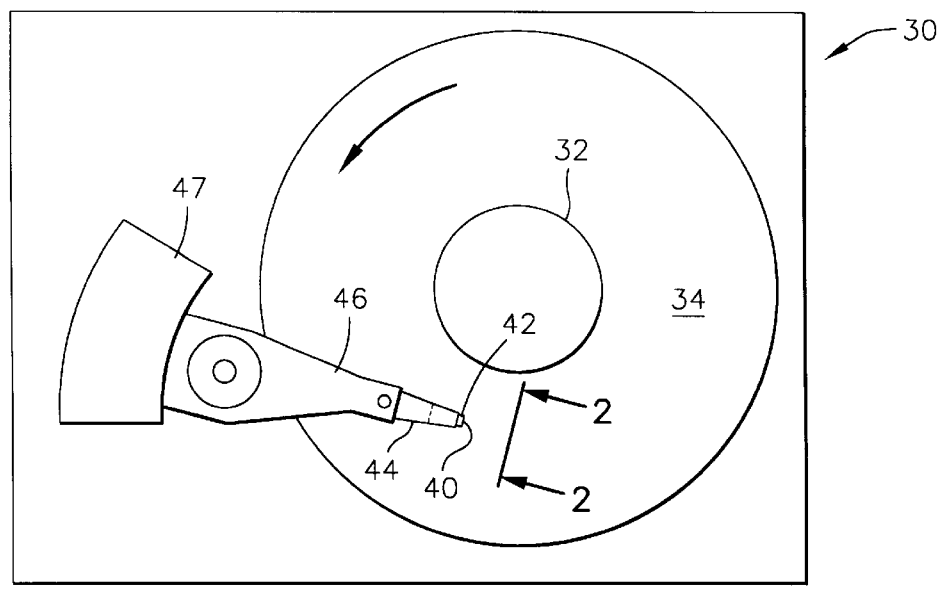
FIG. 1 is a plan view of an exemplary magnetic disk drive.
Figure 2:
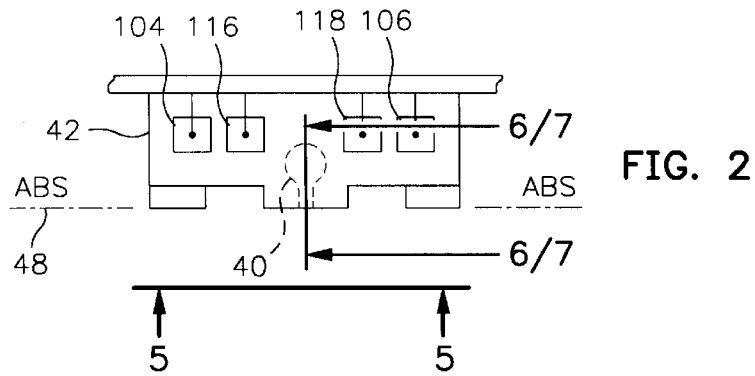
FIG. 2 is an end view of a slider with a magnetic head of the disk drive as seen in plane 2—2 of FIG. 1.
Figure 3:
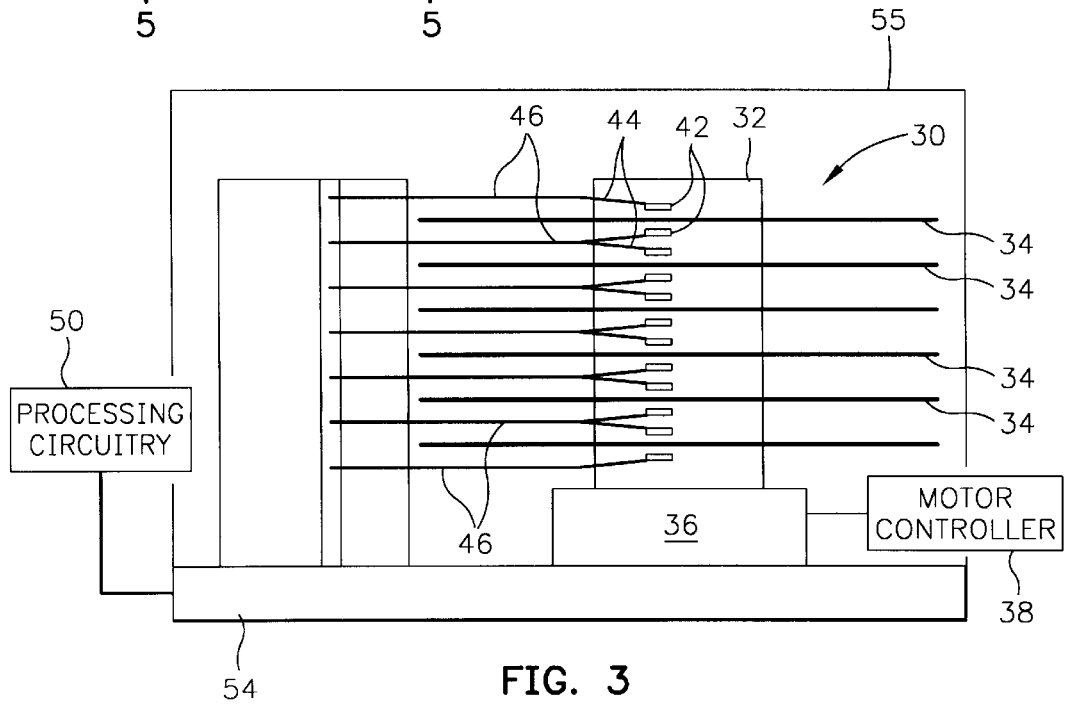
FIG. 3 is an elevation view of the magnetic disk drive wherein multiple disks and magnetic heads are employed.
Figure 4:
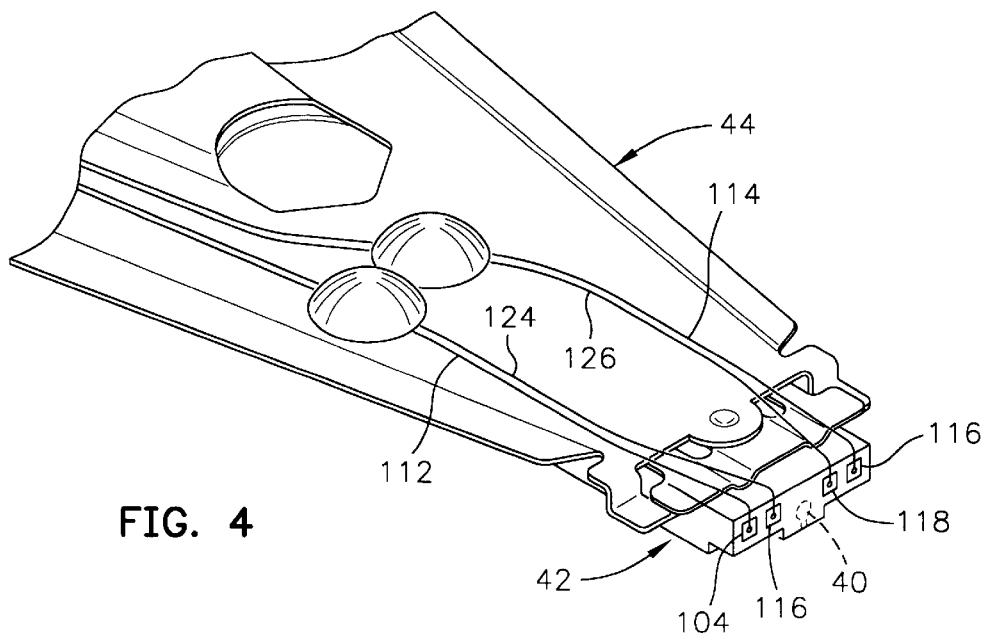
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
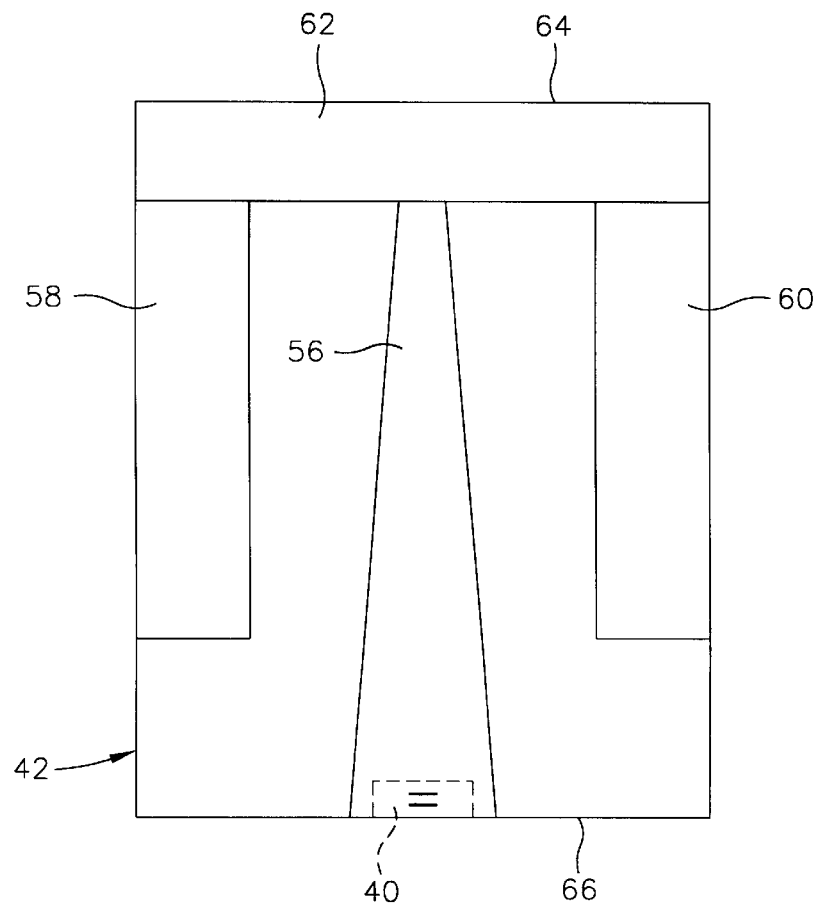
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
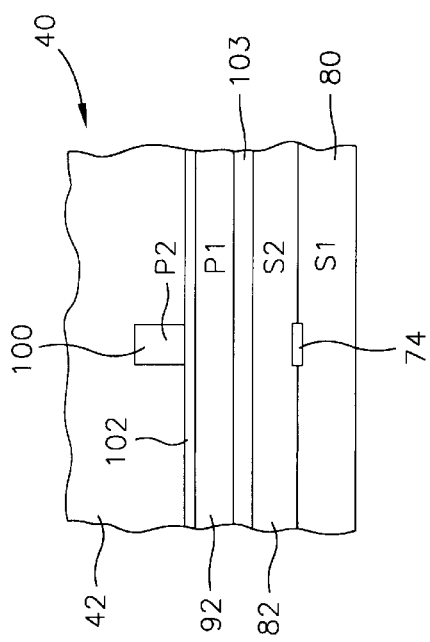
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a tunnel junction sensor 74 of the present invention. FIG. 8 is an ABS view of FIG. 6. The tunnel junction sensor 74 is sandwiched between ferromagnetic first and second shield layers 80 and 82. In response to external magnetic fields, the resistance of the tunnel junction sensor 74 changes. A tunneling current ($I_T$) conducted through the sensor causes these resistance changes to be manifested as potential changes. These potential changes are then processed as readback signals by the processing circuitry 50 shown in FIG. 3. The tunneling current ($I_T$) may be conducted through the tunnel junction sensor 74 perpendicular to the planes of its film surfaces by the first and second shield layers 80 and 82 which serve as first and second leads, which will be discussed in more detail hereinafter.

Figure 10:
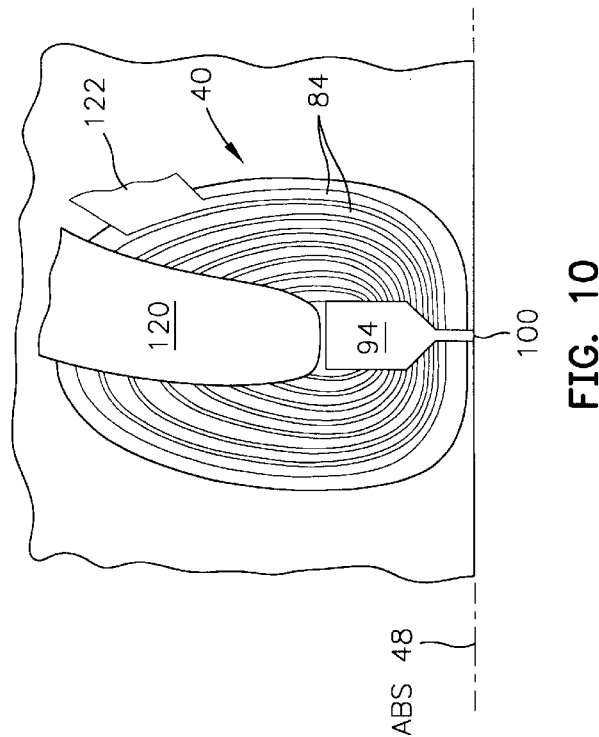
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
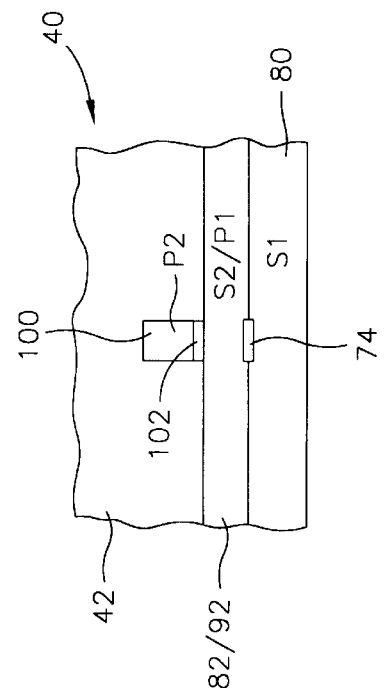
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 12:
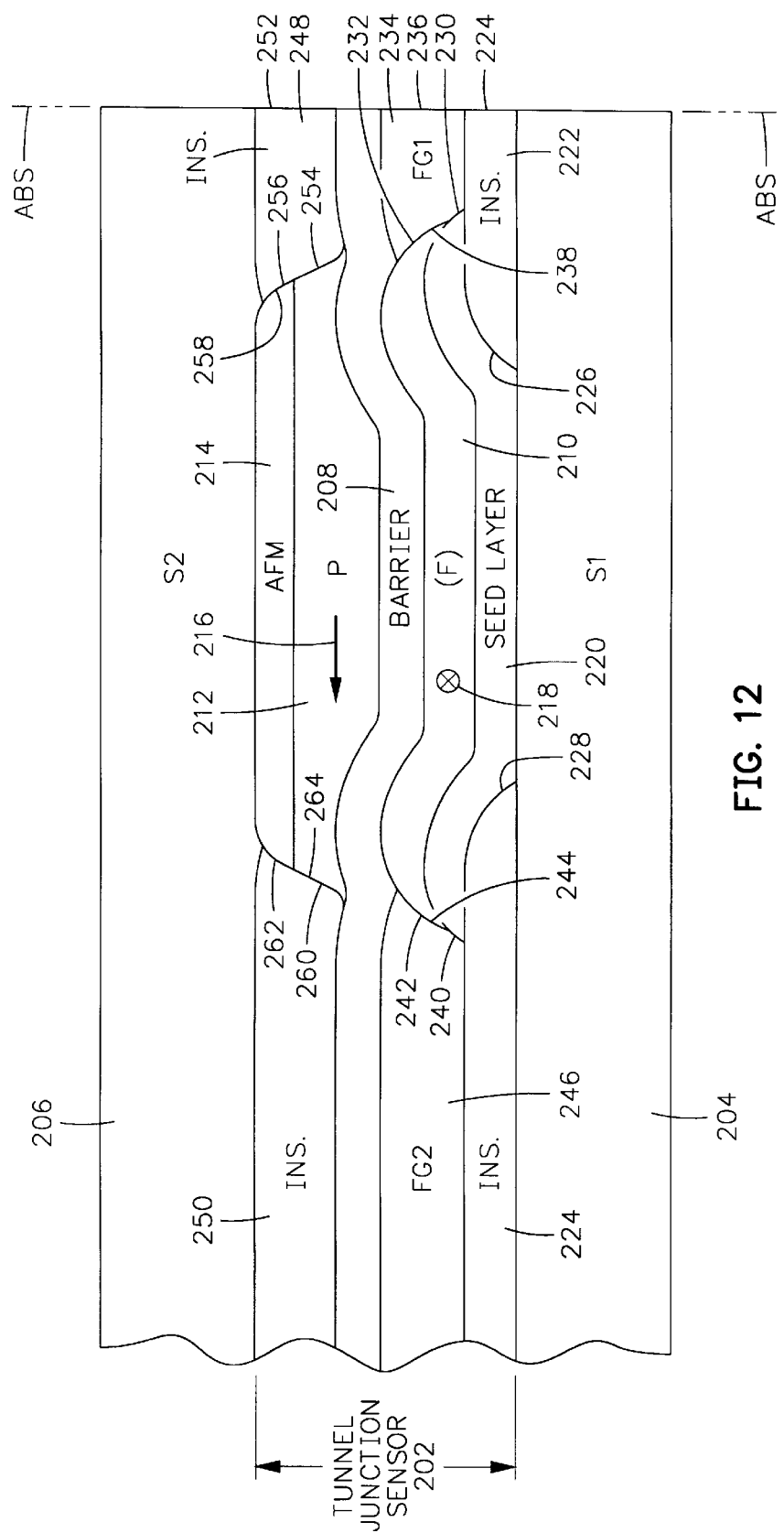
FIG. 12 is a view taken along plane 12—12 of FIG. 11.

FIG. 11 shows an ABS illustration of the present tunnel junction read head 200. The read head 200 includes a tunnel junction sensor 202 which is located between ferromagnetic first and second shield layers (S1) and (S2) 204 and 206. The tunnel junction sensor includes an insulative barrier layer 208 which is between a ferromagnetic free layer 210 and a ferromagnetic pinned layer 212. The pinned layer 212 is exchange coupled to an antiferromagnetic (AFM) pinning layer 214 so that the pinning layer 214 pins a magnetic moment 216 perpendicular to the ABS, such as into the head as shown in FIG. 12. The magnetic moment 218 of the free layer is parallel to the ABS and may be directed into the paper, as shown in FIG. 12. When a signal field from a rotating magnetic disk rotates the magnetic moment 218 into the head, it becomes more parallel to the magnetic moment 216, which reduces the resistance of the tunnel junction sensor, and when a signal field from the rotating magnetic disk rotates the magnetic moment 218 toward the ABS, the magnetic moments 218 and 216 become more antiparallel, which increases the resistance of the tunnel junction sensor. These resistance changes cause potential changes in the processing circuitry 50 in FIG. 3, which are processed as playback signals. A seed layer 220 is typically located between the free layer 210 and the first shield layer 204 to improve magnetoresistance and magnetic properties.

As shown in FIG. 12, the tunnel junction sensor may have first and second spaced-apart insulation layers (Ins.) 222 and 224 with the first insulation layer 222 having a first edge 224 at the ABS and a second edge 226 recessed in the head and spaced from a first edge 228 of the second insulation layer. The seed layer 220 and the free layer 210 are preferably located within the space between the first and second insulation layers 222 and 224 and have forward portions with first edges 230 and 232, which overlap a recessed end portion of the first insulation layer 222. A first flux guide (FG1) 234 has a first edge 236 which is located at the ABS and a second edge 238 which abuts the first edges 230 and 232 of the seed and free layers. In a still further preferred embodiment the seed and free layers have rear portions which overlap the second insulation layer 224 with second edges 240 and 242 which abut a first edge 244 of a second flux guide (FG2) 246. The second flux guide 246 extends a stripe height of the free layer 210 into the head for minimizing flux decay from the free layer when it receives signal fields from the rotating magnetic disk.

The barrier layer 208 extends over the first flux guide 234, the free layer 210 and the second flux guide 246. On top of the barrier layer 208 is the pinned and pinning layers 212 and 214. The pinned and pinning layers may be located between spaced apart third and fourth insulation layers (Ins.) 248 and 250 with the first insulation layer having a first edge 252 which is located at the ABS. The pinned and pinning layers may be located between the space between the third and fourth insulation layers with first edges 254 and 256 abutting a recessed second edge 258 of the third insulation layer and having second edges 260 and 262 which abut a first edge 264 of the fourth insulation layer.

Typical thicknesses and materials of the layers are 2 μm of nickel iron (NiFe) for the first shield layer 204, 10 Å of copper (Cu) for the seed layer 220, 30 Å of nickel iron (NiFe) for the free layer 210, 10 Å of aluminum oxide ($Al_2O_3$) for the barrier layer 208, 30 Å of cobalt iron (CoFe) for the pinned layer 212, 200 Å of a metal such as nickel manganese (NiMn) for the pinning layer 214 and 2 μm of nickel iron (NiFe) for the second shield layer 206. Each of the first and second flux guides 234 and 246 may be 100 Å thick and constructed of nickel iron (NiFe). Each of the first, second, third and fourth insulation layers 222, 224, 248 and 250 may be aluminum oxide ($Al_2O_3$). Optionally, the free layer 210 may include a 15 Å thick nickel iron (NiFe) film and a 15 Å thick cobalt iron (CoFe) film with the cobalt iron (CoFe) film located between the nickel iron (NiFe) film and the barrier layer 208 for increasing the magnetoresistance.

It can be seen from FIG. 12 that because of the very thin barrier layer 208, which is on the order of 10 Å thick, there is a very small distance between the free and pinned layers 210 and 212. If the first edges 232 and 254 of these layers extended all the way to the ABS, there would be a risk that conductive material would be smeared across the barrier layer at the ABS shorting the free and pinned layers. This has been overcome in this invention by recessing the first edges 230 and 232 of the free and pinned layers, as well as the first edges 230 and 256 of the seed and pinning layers. By magnetically connecting the first flux guide 234 to the free layer 210, the spacing between the conductive layers, which are the flux guide 234 and the first and second shield layers 204 and 206, at the ABS are located farther apart. The thickness of the first insulation layer 222 may be on the order of 100 Å and the thickness of the third insulation layer 248 may be on the order of 100 Å. The first insulation layer 222 is located between the first shield layer 204 and the flux guide 234 at the ABS and the barrier layer 208 and the third insulation layer 248 are located between the flux guide 234 and the second shield layer 206 at the ABS. With this additional spacing there is less risk of smearing of conductive material between the conductive layers at the ABS.

It should be understood that the thicknesses and materials of the layers are exemplary, except the first insulation layer 222 should be thicker than the barrier layer 208. It should be noted from FIG. 11 that the track width (TW) of the read head is defined by the width of the flux guide 234 at the ABS.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A magnetic read head, which has an air bearing surface (ABS), comprising:

a ferromagnetic pinned layer which has a magnetic moment;

an antiferromagnetic pinning layer exchange coupled to the pinned layer for pinning the magnetic moment of the pinned layer in a predetermined direction;

a ferromagnetic free layer which has a magnetic moment;

a nonmagnetic insulative barrier layer between the free and pinned layers;

each of the free layer and the pined layer having oppositely facing first and second edges that are recessed from the ABS;

a ferromagnetic first flux guide layer magnetically coupled to the free layer; and the first flux guide layer having oppositely facing first and second edges with the first edge being located at the ABS and the second edge abutting the first edge of the free layer.

2. A magnetic read head, which has an air bearing surface (ABS), comprising:
   a ferromagnetic pinned layer which has a magnetic moment;
   an antiferromagnetic pinning layer exchange coupled to the pinned layer for pinning the magnetic moment of the pinned layer in a predetermined direction;
   a ferromagnetic free layer which has a magnetic moment;
   a nonmagnetic insulative barrier layer between the free and pinned layers;
   each of the free layer and the pinned layer having oppositely facing first and second edges that are recessed from the ABS;
   a ferromagnetic first flux guide layer magnetically coupled to the free layer;
   the first flux guide layer having oppositely facing first and second edges with the first edge being located at the ABS;
   ferromagnetic first and second shield layers; and
   the free, barrier, pinned and pinning layers being located between the first and second shield layers with the free layer being electrically connected to the first shield layer and the pinning layer being electrically connected to the second shield layer.

3. A magnetic read head as claimed in claim 2 including:
   nonmagnetic insulative first and second insulation layers;
   the first flux guide layer and the barrier layer being located between the first and second insulation layers and the first and second insulation layers being located between the first and second shield layers.

4. A magnetic read head as claimed in claim 3 including:
   a second flux guide layer that has oppositely facing first and second edges; and
   the first side edge of the second flux guide abutting the second edge of the free layer.

5. A magnetic read head as claimed in claim 4 including:
   a nonmagnetic insulative third insulation layer; and
   the second flux guide layer and the barrier layer being located between the second and third insulation layers.

6. A magnetic read head as claimed in claim 3 wherein a portion of the free layer including the first edge of the free layer overlap the first insulation layer.

7. A magnetic read head as claimed in claim 6 wherein the second edge of the first flux guide abuts the first edge of the free layer.

8. A magnetic read head as claimed in claim 7 wherein a portion of the seed layer including a first edge of the seed layer overlap the first insulation layer.

9. A magnetic read head as claimed in claim 8 including:
   each of the free layer and a seed layer having oppositely facing first and second film surfaces;
   the first film surface of the seed layer interfacing the first shield layer and the second film surface of the seed layer interfacing the free layer;
   the seed layer having oppositely facing first and second edges that are recessed from the ABS; and
   the second edge of the first flux guide abutting the first edge of the seed layer.

10. A magnetic read head as claimed in claim 9 including:
    a second flux guide layer that has oppositely facing first and second edges; and
    the first side edge of the second flux guide abutting the second edge of the free layer.

11. A magnetic read head as claimed in claim 10 including:
    a nonmagnetic insulative third insulation layer; and
    the second flux guide layer and the barrier layer being located between the second and third insulation layers.

12. A magnetic head assembly, having an air bearing surface (ABS), comprising:
    a write head including:
       ferromagnetic first and second pole piece layers that have a yoke portion located between a pole tip portion and a back gap portion;
       a nonmagnetic write gap layer located between the pole tip portions of the first and second pole piece layers;
       an insulation stack with at least one coil layer embedded therein located between the yoke portions of the first and second pole piece layers; and
       the first and second pole piece layers being connected at their back gap portions;
    a read head including:
       a read sensor;
       ferromagnetic first and second shield layers; and
       the read sensor being located between the first and second shield layers;
    the read sensor including:
       a ferromagnetic pinned layer which has a magnetic moment;
       an antiferromagnetic pinning layer exchange coupled to the pinned layer for pinning the magnetic moment of the pinned layer in a predetermined direction;
       a ferromagnetic free layer which has a magnetic moment;
       a nonmagnetic insulative barrier layer between the free and pinned layers;
       each of the free layer and the pinned layer having oppositely facing first and second edges that are recessed from the ABS;
       a ferromagnetic first flux guide layer magnetically coupled to the free layer; and
       the first flux guide layer having oppositely facing first and second edges with the first edge being located at the ABS and the second edge abutting the first edge of the free layer.

13. A magnetic head assembly, having an air bearing surface (ABS), comprising:
    a write head including:
       ferromagnetic first and second pole piece layers that have a yoke portion located between a pole tip portion and a back gap portion;
       a nonmagnetic write gap layer located between the pole tip portions of the first and second pole piece layers;
       an insulation stack with at least one coil layer embedded therein located between the yoke portions of the first and second pole piece layers; and
       the first and second pole piece layers being connected at their back gap portions;
    a read head including:
       a read sensor;
       ferromagnetic first and second shield layers; and
       the read sensor being located between the first and second shield layers;
    the read sensor including:
       a ferromagnetic pinned layer which has a magnetic moment;
       an antimagnetic pining layer exchange coupled to the pinned layer for pinning
       the magnetic moment of the pinned layer in a predetermined direction;

a ferromagnetic free layer which has a magnetic moment;
a nonmagnetic insulative barrier layer between the free and pinned layers;
each of the free layer and the pinned layer having oppositely facing first and second edges that are recessed from the ABS;
a ferromagnetic first flux guide layer magnetically coupled to the free layer;
the first flux guide layer having oppositely facing first and second edges with the first edge being located at the ABS; and
a nonmagnetic insulative isolation layer located between the second shield layer and the first pole piece layer.

14. A magnetic head assembly, having an air bearing surface (ABS), comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head including:
a read sensor;
ferromagnetic first and second shield layers; and
the read sensor being located between the first and second shield layers;
the read sensor including:
a ferromagnetic pinned layer which has a magnetic moment;
an antiferromagnetic pinning layer exchange coupled to the pinned layer for pinning the magnetic moment of the pinned layer in a predetermined direction;
a ferromagnetic free layer which has a magnetic moment;
a nonmagnetic insulative barrier layer between the free and pinned layers;
each of the free layer and the predetermined layer having oppositely facing first and second edges that are recessed from the ABS;
a ferromagnetic first flux guide layer magnetically coupled to the free layer;
the first flux guide layer having oppositely facing first and second edges with the first edge being located at the ABS;
ferromagnetic first and second shield layers; and
the free, barrier, pinned and pinning layers being located between the first and second shield layers with the free layer being electrically connected to the first shield layer and the pinning layer being electrically connected to the second shield layer.

15. A magnetic head assembly as claimed in claim 14 including:
nonmagnetic insulative first and second insulation layers; and
the first flux guide layer and the barrier layer being located between the first and second insulation layers and the first and second insulation layers being located between the first and second shield layers.

16. A magnetic head assembly as claimed in claim 15 including:

a portion of the free layer including the first edge of the free layer overlapping the first insulation layer; and
the second edge of the first flux guide abutting the first edge of the free layer.

17. A magnetic head assembly as claimed in claim 16 including:
a portion of the seed layer including a first edge of the seed layer overlapping the first insulation layer;
each of the free layer and a seed layer having oppositely facing first and second film surfaces;
the first film surface of the seed layer interfacing the first shield layer and the second film surface of the seed layer interfacing the free layer;
the seed layer having oppositely facing first and second edges that are recessed from the ABS; and
the second edge of the first flux guide abutting the first edge of the seed layer.

18. A magnetic head assembly as claimed in claim 17 including:
a second flux guide layer that has oppositely facing first and second edges; and
the first side edge of the second flux guide abutting the second edge of the free layer.

19. A magnetic head assembly as claimed in claim 18 including:
a nonmagnetic insulative third insulation layer; and
the second flux guide layer and the barrier layer being located between the second and third insulation layers.

20. A magnetic disk drive comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
a read head, which has an air bearing surface (ABS), including:
a read sensor;
ferromagnetic first and second shield layers; and
the read sensor being located between the first and second shield layers;
the read sensor including:
a ferromagnetic pinned layer which has a magnetic moment;
an antiferromagnetic pinning layer exchange coupled to the pinned layer for pinning the magnetic moment of the pinned layer in a predetermined direction;
a ferromagnetic free layer which has a magnetic moment;
a nonmagnetic insulative barrier layer between the free and pinned layers;
each of the free layer and the pinned layer having oppositely facing first and second edges that are recessed from the ABS;
a ferromagnetic first flux guide layer magnetically coupled to the free layer; and
the first flux guide layer having oppositely facing first and second edges with the first edge being located at the ABS and the second edge abutting the first edge of the free layer;

a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head for controlling movement of the magnetic disk and for controlling the position of the magnetic head.

21. A magnetic disk drive comprising:
a write head including:
 ferromagnetic first and second pole piece layers that have a yoke portion located between a pole tip portion and a back gap portion;
 a nonmagnetic write gap layer located between the pole tip portions of the first and second pole piece layers;
 an insulation stack with at least one coil layer embedded therein located between the yoke portions of the first and second pole piece layers; and
 the first and second pole piece layers being connected at their back gap portions;
a read head, which has an air bearing surface (ABS), including:
 a read sensor;
 ferromagnetic first and second shield layers; and
 the read sensor being located between the first and second shield layers;
the read sensor including:
 a ferromagnetic pinned layer which has a magnetic moment;
 an antiferromagnetic pinning layer exchange coupled to the pinned layer for pinning the magnetic moment of the pinned layer in a predetermined direction;
 a ferromagnetic free layer which has a magnetic moment,
 a nonmagnetic insulative barrier layer between the free and pinned layers;
 each of the free layer and the pinned layer having oppositely facing first and second edges that are recessed from the ABS;
 a ferromagnetic first flux guide layer magnetically coupled to the free layer; and
 the first flux guide layer having oppositely facing first and second edges with the first edge being located at the ABS; and
 a nonmagnetic insulative isolation layer located between the second shield layer and the first pole piece layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head for controlling movement of the magnetic disk and for controlling the position of the magnetic head.

22. A magnetic disk drive comprising:
a write head including:
 ferromagnetic first and second pole piece layers that have a yoke portion located between a pole tip portion and a back gap portion;
 a nonmagnetic write gap layer located between the pole tip portions of the first and second pole piece layers;
 an insulation stack with at least one coil layer embedded therein located between the yoke portions of the first and second pole piece layers; and
 the first and second pole piece layers being connected at their back gap portions;
a read head, which has an air bearing surface (ABS), including:
 a read sensor;
 ferromagnetic first and second shield layers; and
 the read sensor being located between the first and second shield layers;
the read sensor including:
 a ferromagnetic pinned layer which has a magnetic moment;
 an antromagnetic pinning layer exchange coupled to the pinned layer for pinning the magnetic moment of the pinned layer in a predetermined direction;
 a ferromagnetic free layer which has a magnetic moment;
 a nonmagnetic insulative barrier layer between the free and pinned layers;
 each of the free layer and the pinned layer having oppositely facing first and second edges that are recessed from the ABS;
 a ferromagnetic first flux guide layer magnetically coupled to the free layer; and
 the first flux guide layer having oppositely facing first and second edges with the first edge being located at the ABS;
 ferromagnetic first and second shield layers; and
 the free, barrier, pinned and pinning layers being located between the first and second shield layers with the free layer being electrically connected to the first shield layer and the pinning layer being electrically connected to the second shield layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head for controlling movement of the magnetic disk and for controlling the position of the magnetic head.

23. A magnetic disk drive as claimed in claim 22 including:
nonmagnetic insulative first and second insulation layers; and
the first flux guide layer and the barrier layer being located between the first and second insulation layers and the first and second insulation layers being located between the first and second shield layers.

24. A magnetic disk drive as claimed in claim 23 including:
   a portion of the free layer including the first edge of the free layer overlapping the first insulation layer; and
   the second edge of the first flux guide abutting the first edge of the free layer.

25. A magnetic disk drive as claimed in claim 24 including:
   a portion of the seed layer including a first edge of the seed layer overlapping the first insulation layer,
   each of the free layer and a seed layer having oppositely facing first and second film surfaces;
   the first film surface of the seed layer interfacing the first shield layer and the second film surface of the seed layer interfacing the free layer;
   the seed layer having oppositely facing first and second edges that are recessed from the ABS; and
   the second edge of the first flux guide abutting the first edge of the seed layer.

26. A magnetic disk drive as claimed in claim 25 including:
   a second flux guide layer that has oppositely facing first and second edges; and
   the first side edge of the second flux guide abutting the second edge of the free layer.

27. A magnetic disk drive as claimed in claim 26 including:
   a nonmagnetic insulative third insulation layer; and
   the second flux guide layer and the barrier layer being located between the second and third insulation layers.

28. A method of making a magnetic read head, which has an air bearing surface (ABS), including the steps of:
   forming a ferromagnetic pinned layer with oppositely facing first and second edges that are recessed from the ABS;
   forming an antiferromagnetic pinning layer exchange coupled to the pinned layer for pinning a magnetic moment of the pinned layer in a predetermined direction;
   forming a feromagnetic free layer with a magnetic moment and with oppositely facing first and second edges that are recessed from the ABS;
   forming a nonmagnetic insulative barrier layer between the free and pinned layers; and
   forming a ferromagnetic first flux guide layer magnetically coupled to the free layer and having oppositely facing first and second edges with the first edge of the first flux guide being located at the ABS and the second edge abutting the first edge of the free layer.

29. A method of making a magnetic read head, which has an air bearing surface (ABS), including the steps of:
   forming a ferromagnetic pinned layer with oppositely ficing first and second edges that are recessed from the ABS;
   forming an antiferromagnetic pinning layer exchange coupled to the pinned layer for pinning a magnetic moment of the pinned layer in a predetermined direction;
   forming a ferromagnetic free layer with a magnetic moment and with oppositely facing first and second edges that are recessed from the ABS;
   forming a nonmagnetic insulative barrier layer between the free and pinned layers;
   forming a ferromagnetic first flux guide layer magnetically coupled to the free layer and having oppositely facing first and second edges with the first edge of the first flux guide being located at the ABS;
   forming first and second ferromagnetic first and second shield layers; and
   the free, barrier, pinned and pinning layers being formed between the first and second shield layers with the free layer electrically connected to the first shield layer and the pinning layer electrically connected to the second shield layer.

30. A method of making a magnetic read head as claimed in claim 29 further including the steps of:
   forming nonmagnetic insulative first and second insulation layers; and
   the first flux guide layer and the barrier layer being formed between the first and second insulation layers and the first and second insulation layers being formed between the first and second shield layers.

31. A method of making a magnetic readhead as claimed in claim 30 further including the steps of:
   forming a second flux guide layer with oppositely facing first and second edges and with the first side edge of the second flux guide abutting the second edge of the free layer.

32. A method of making a magnetic read head as claimed in claim 31 further including the steps of:
   forming a nonmagnetic insulative third insulation layer, and;
   the second flux guide layer and the barrier layer being formed between the second and third insulation layers.

33. A method of making a magnetic read head as claimed in claim 30 wherein a portion of the free layer including the first edge of the free layer are formed to overlap the first insulation layer.

34. A method of making a magnetic read head as claimed in claim 33 wherein the second edge of the first flux guide is formed to abut the first edge of the free layer.

35. A method of making a magnetic read head as claimed in claim 34 wherein a portion of the seed layer including a first edge of the seed layer are formed to overlap the first insulation layer.

36. A method of making a magnetic read head as claimed in claim 35 further including the steps of:
   each of the free layer and a seed layer being formed with oppositely facing first and second film surfaces with the first film surface of the seed layer interfacing the first shield layer and the second film surface of the seed layer interfacing the free layer; and
   the seed layer being formed with oppositely facing first and second edges that are recessed from the ABS with the second edge of the first flux guide abutting the first edge of the seed layer.

37. A method of making a magnetic read head as claimed in claim 36 further including the steps of:
   forming a second flux guide layer with oppositely facing first and second edges and with the first side edge of the second flux guide abutting the second edge of the free layer.

38. A method of making a magnetic read head as claimed in claim 37 further including the steps of:
   forming a nonmagnetic insulative third insulation layer; and
   the second flux guide layer and the barrier layer being formed between the second and third insulation layers.

39. A method of making a magnetic head assembly, which has an air bearing surface (ABS), comprising the steps of:
    making a write head comprising the steps of:
        forming ferromagnetic first and second pole piece layers in pole tip, yoke and back gap regions wherein the yoke region is located between the pole tip and back gap regions;
        forming a nonmagnetic nonconductive write gap layer between the first and second pole piece layers in the pole tip region;
        forming an insulation stack with at least one coil layer embedded therein between the first and second pole piece layers in the yoke region; and
        connecting the first and second pole piece layers at said back gap region;
    making a read head as follows:
        forming a read sensor;
        forming ferromagnetic first and second shield layers; and
        the read sensor being formed between the first and second shield layers;
    forming the read sensor as follows:
        forming a ferromagnetic pinned layer with oppositely facing first and second edges that are recessed from the ABS;
        forming an antiferromagnetic pinning layer exchange coupled to the pinned layer for pinning a magnetic moment of the pinned layer in a predetermined direction;
        forming a ferromagnetic free layer with a magnetic moment and with oppositely facing first and second edges that are recessed from the ABS;
        forming a nonmagnetic insulative barrier layer between the free and pinned layers; and
        forming a ferromagnetic first flux guide layer magnetically coupled to the free layer and having oppositely facing first and second edges with the first edge of the first flux guide being located at the ABS and the second edge abutting the first edge of the free layer.

40. A method of making a magnetic head assembly, which has an air bearing surface (ABS), comprising the steps of:
    making a write head comprising the steps of:
        forming ferromagnetic first and second pole piece layers in pole tip, yoke and back gap regions wherein the yoke region is located between the pole tip and back gap regions;
        forming a nonmagnetic nonconductive write gap layer between the first and second pole piece layers in the pole tip region;
    forming an insulation stack with at least one coil layer embedded therein between the first and second pole piece layers in the yoke region; and
    connecting the first and second pole piece layers at said back gap region;
    making a read head as follows:
        forming a read sensor;
        forming ferromagnetic first and second shield layers; and
        the read sensor being formed between the first and second shield layers;
    forming the read sensor as follows:
        forming a ferromagnetic pinned layer with oppositely facing first and second edges that are recessed from the ABS;
        forming an antiferromagnetic pinning layer exchange coupled to the pinned layer for pinning a magnetic moment of the pinned layer in a predetermined direction;
        forming a ferromagnetic free layer with a magnetic moment and with oppositely facing first and second edges that are recessed from the ABS;
        forming a nonmagnetic insulative barrier layer between the free and pinned layers;
        forming a ferromagnetic first flux guide layer magnetically coupled to the free layer and having oppositely facing first and second edges with the first edge of the first flux guide being located at the ABS; and
        forming a nonmagnetic insulative isolation layer between the second shield layer and the first pole piece layer.

41. A method of making a magnetic head assembly, which has an air bearing surface (ABS), comprising the steps of:
    making a write head comprising the steps of:
        forming ferromagnetic first and second pole piece layers in pole tip, yoke and back gap regions wherein the yoke region is located between the pole tip and back gap regions;
        forming a nonmagnetic nonconductive write gap layer between the first and second pole piece layers in the pole tip region;
        forming an insulation stack with at least one coil layer embedded therein between the first and second pole piece layers in the yoke region; and
        connecting the first and second pole piece layers at said back gap region;
    making a read head as follows:
        forming a read sensor;
        forming ferromagnetic first and second shield layers; and
        the read sensor being formed between the first and second shield layers;
    forming the read sensor as follows:
    forming a ferromagnetic pinned layer with oppositely facing first and second edges that are recessed from the ABS;
        forming an antiferromagnetic pinning layer exchange coupled to the pinned layer for pinning a magnetic moment of the pinned layer in a predetermined direction;
        forming a ferromagnetic free layer with a magnetic moment and with oppositely facing first and second edges that are recessed from the ABS;
        forming a nonmagnetic insulative barrier layer between the free and pinned layers;
        forming a ferromagnetic first flux guide layer magnetically coupled to the free layer and having oppositely facing first and second edges with the first edge of the first flux guide being located at the ABS; and
        forming first and second ferromagnetic first and second shield layers; and
        the free, barrier, pinned and pinning layers being formed between the first and second shield layers with the free layer electrically connected to the first shield layer and the pinning layer electrically connected to the second shield layer.

42. A method of making a magnetic head assembly as claimed in claim 41 further including the steps of:
    forming nonmagnetic insulative first and second insulation layers; and
    the first flux guide layer and the barrier layer being formed between the first and second insulation layers and the first and second insulation layers being formed between the first and second shield layers.

43. A method of making a magnetic head assembly as claimed in claim 42 further including the steps of:

a portion of the free layer including the first edge of the free layer being formed to overlap the first insulation layer; and the second edge of the first flux guide being formed to abut the first edge of the free layer.

44. A method of making a magnetic head assembly as claimed in claim 43 further including the steps of:

a portion of the seed layer including a first edge of the seed layer being formed to overlap the first insulation layer;

each of the free layer and a seed layer being formed with oppositely facing first and second film surfaces with the first film surface of the seed layer interfacing the first shield layer and the second film surface of the seed layer interfacing the free layer; and the seed layer being formed with oppositely facing first and second edges that are recessed from the ABS with the second edge of the first flux guide abutting the first edge of the seed layer.

45. A method of making a magnetic head assembly as claimed in claim 44 further including the steps of:

forming a second flux guide layer with oppositely facing first and second edges and with the first side edge of the second flux guide abutting the second edge of the free layer.

46. A method of making a magnetic head assembly as claimed in claim 45 further including the steps of:

forming a nonmagnetic insulative third insulation layer; and the second flux guide layer and the barrier layer being formed between the second and third insulation layers.

* * * * *